United States Patent
Baldwin et al.

[11] Patent Number: 5,951,402
[45] Date of Patent: Sep. 14, 1999

[54] DRIVELINE ASSEMBLY

[75] Inventors: Kevin Baldwin, Rochester Hills; Ronald N. Brissette, Lake Orion, both of Mich.

[73] Assignee: Meritor Heavy Vehicle Systems, L L C, Troy, Mich.

[21] Appl. No.: 08/899,532

[22] Filed: Jul. 24, 1997

[51] Int. Cl.⁶ .................................................. F16D 3/06
[52] U.S. Cl. .................................... 464/162; 464/180
[58] Field of Search .................................. 464/162, 179, 464/181, 183, 73, 74, 75; 280/777; 74/493; 403/359

[56] References Cited

U.S. PATENT DOCUMENTS

| | | | |
|---|---|---|---|
| 2,072,090 | 3/1937 | Anderson | 464/162 |
| 3,066,503 | 12/1962 | Fleming et al. | |
| 3,383,756 | 5/1968 | Smirl | 464/162 |
| 4,406,641 | 9/1983 | Mallet | 464/180 |
| 4,552,544 | 11/1985 | Beckman et al. | 464/162 |
| 4,667,530 | 5/1987 | Mettler et al. | 464/162 |
| 4,862,976 | 9/1989 | Meek | 464/162 |
| 5,243,874 | 9/1993 | Wolfe et al. | |
| 5,460,574 | 10/1995 | Hobaugh | 464/180 |
| 5,672,111 | 9/1997 | Schremmer et al. | 464/75 |
| 5,771,737 | 6/1998 | Yaegashi | 72/367 |

FOREIGN PATENT DOCUMENTS

| | | |
|---|---|---|
| 0747605 | 12/1996 | European Pat. Off. |
| 2749258 | 12/1997 | France |
| 4427532 | 3/1995 | Germany |
| 19515103 | 11/1996 | Germany |

*Primary Examiner*—Eileen Dunn Lillis

[57] ABSTRACT

A driveline assembly including a tubular male member and a tubular female member both disposed about an axis and having thin walls defining inner and outer surfaces. Both the male and female members are fixed to yokes. The yoke of the female member is coupled to a transmission and the yoke of the male member is coupled to a wheel axle. An elastomeric sleeve is adhered to and conforms with the inner surface of the female member and is complementary in configuration to the outer surface of the male member. A male tooth is formed within the thin wall of the male member and a female tooth is formed within the thin wall of the female member. Each tooth has a linear portion and a pair of legs. The legs of the male and female teeth are separated by additional circumferentially extending linear portions. The male member nonrotatably engages the female member for transmitting torque from the transmission to the axle. Specifically, the female member is the drive shaft and the male member is the driven shaft. The male member can also slide within the female member to permit relative longitudinal movement between the two members for assembly and disassembly and for absorbing exterior forces.

8 Claims, 4 Drawing Sheets

DRIVELINE ASSEMBLY

BACKGROUND OF THE INVENTION

The subject invention relates to nonrotatably connected telescoping driveline assemblies for heavy vehicles. Current driveline assemblies include splined male and female members which are nonrotatably connected to transmit rotational movement from one member to the other. Typically, the female member drives the male member. The driveline assemblies also permit relative longitudinal movement between the male and female members. In other words the male member can slide or slip within the female member to facilitate assembly and disassembly as well as assisting in absorbing exterior forces. The exterior forces are usually created by movement of the vehicle over a road surface.

The female member is typically attached to a yoke and includes a number of internal substantially rectangular splines. The female member is machined from ductile iron castings, forgings or bar stock and requires spline broaching, drilling and tapping along with outside diameter turning.

The male member is also typically attached to a yoke or tube and has a number of external substantially rectangular splines. The external splines are made from forgings and require turning, hobbing, hurth milling, or rolling to achieve the appropriate sizing. In addition, the external splines require induction hardening and a polyglide coating.

The splines of the male member slideably engage the splines of the female member. Hence, the male member can slide or slip within the female member; however, the male member must not be too loose as to affect the balance, vibration, or overall performance of the vehicle. Accordingly, the sizing of the internal and external splines must be closely controlled.

The splines must facilitate the nonrotatable connection and must also exhibit a close tolerance fit to minimize backlash in the transmission of torque from one member to the other. The close tolerances required between the splines is one of the primary difficulties encountered when fabricating these prior art drivelines. The machining operations listed above must take into account various factors which affect the tolerances between the splines and the other parts of the male and female members. These factors can include variations in wall thickness, roundness, and temperature variations. As can be appreciated, machining these members and maintaining the specific tolerances required between the splines for a close metal to metal fit is extremely difficult, expensive and time consuming.

Many designs for nonrotatable telescoping male and female members are known in the prior art. One such design has been proposed for a steering shaft application. In this application, a tube assembly has male and female members with end portions slidably engaged within one another. The male and female members are hollow tubes which have a number of teeth formed along an end portion thereof. The male member is designed smaller than the female member and a void space is formed between the male and female members.

An elastomeric sleeve is injected into the void between the male and female members to nonrotatably connect the male and female members with a minimum amount of relative rotation therebetween. Specifically, the sleeve is adhered to an inside surface of the female member and has a shape complimentary to the outside surface of the male member. The sleeve serves as a tooth size control and as a wear surface for any slipping forces encountered. There is a degree of shrinkage when the elastomeric sleeve cools from an injection temperature to an operating or ambient temperature which allows the male member to slide within the female member. The sleeve assists in reducing backlash and creates an adequate tolerance between the male and female members. This design is effective in reducing the overall weight of the steering tube assembly, improving the fit between the male and female members, reducing the overall manufacturing costs, and increasing manufacturing efficiency. This type connection, however, has not been proposed for use in heavy vehicle drivelines.

Each of the teeth in this type of prior art connection include an outer surface and a pair of legs. The legs of the teeth are directly connected to each other. Hence, the inner surfaces of both the male and female members have a number of V-shaped legs extending outwardly to the outer surfaces. This configuration of teeth appears to operate effectively when utilized in a steering tube assembly. However, if this configuration was enlarged to the size of a typical driveline, the design would not be able to withstand the rotational forces or torque between the two members. Specifically, the legs of the teeth on the female member might operate as ramps for the legs of the teeth on the male member. Thus, one potential deficiency with this known design is the V-shaped interior of the male and female members and the size of the teeth in relation to the overall diameter of the members.

Accordingly, there exists a need for a heavy vehicle driveline assembly that incorporates the advantages of hollow or thin walled male and female members with a custom fit sleeve. Further, there is a need to overcome the deficiencies of the tooth design disclosed above.

SUMMARY OF THE INVENTION

A disclosed driveline assembly includes a tubular male member having an axis with a thin wall defining inner and outer surfaces disposed about the axis of the male member. A tubular female member is disposed about the axis and has a thin wall defining inner and outer surfaces. The male member has first and second ends with a yoke fixedly secured to the second end. The female member similarly has first and second ends with a yoke fixedly secured to the second end. An elastomeric sleeve is injected between the male and female members. The sleeve conforms with the inner surface of said female member and is complementary in configuration with the outer surface of said male member.

The thin wall of the male member presents circumferentially extending first linear portions disposed on a first radius about the axis. A male tooth separates the next adjacent first linear portion. Each male tooth has a circumferentially extending second linear portion disposed on a second radius about the axis. The first radius is larger than the second radius. The thin wall of the female member presents circumferentially extending third linear portions disposed on a third radius about the axis. A female tooth separates the next adjacent third linear portion. Each female tooth has a circumferentially extending fourth linear portion disposed on a fourth radius about the axis. The third radius is larger than the fourth radius.

Accordingly, the driveline of the subject invention incorporates the advantages of thin walled male and female members with a unique tooth design. The teeth, along with the linear portions disposed between the teeth, can withstand the required rotational forces encountered in heavy vehicle drivelines.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
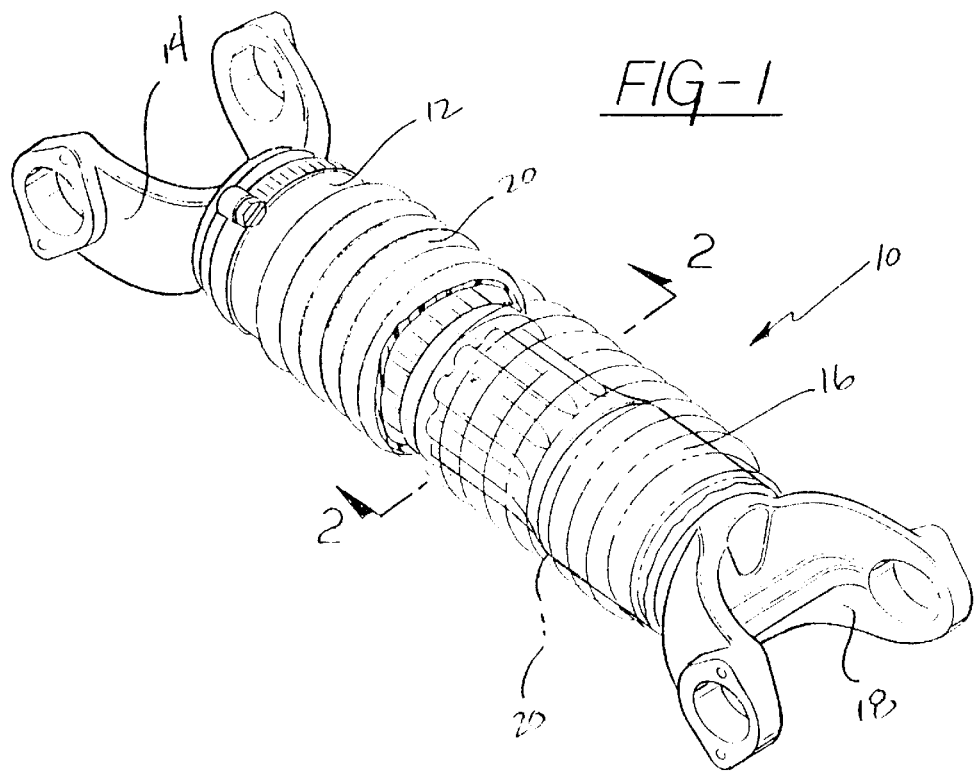
FIG. 1 is a perspective view of the subject invention.

A driveline assembly is generally shown at 10 in FIG. 1. The assembly 10 includes a tubular male member 12 extending to a yoke 14. The assembly 10 also includes a tubular female member 16 extending to a yoke 18. When assembled, the female member 16 slides over the male member 12 and an accordion shaped rubber boot 20 covers the interface between the male 12 and female 16 members to prevent the intrusion of water and/or dirt.

Figure 2:
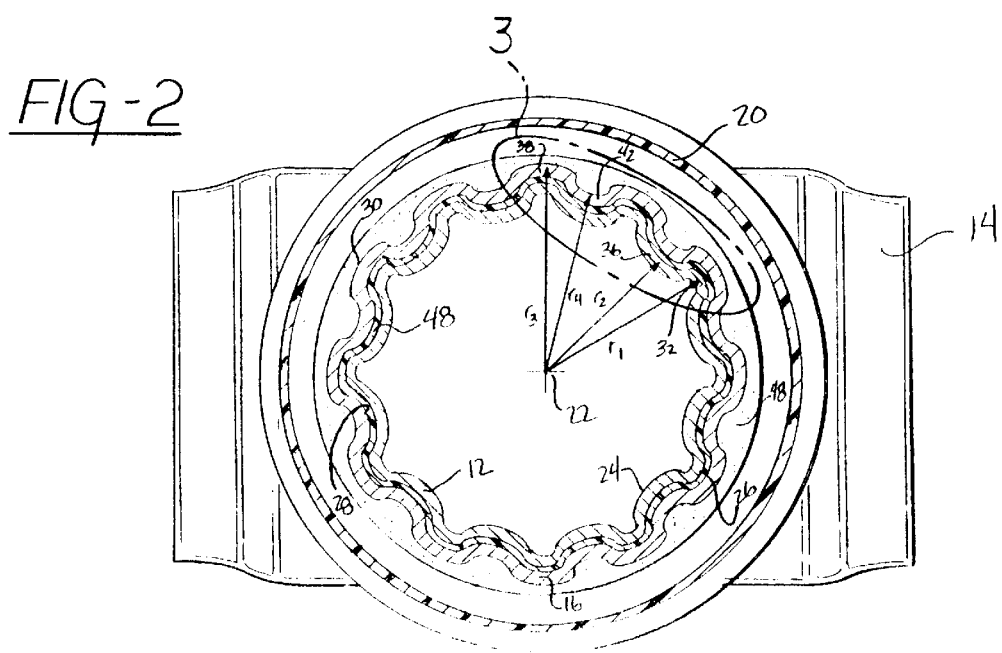
FIG. 2 is a cross-sectional view taken along line 2—2 of FIG. 1.

As can be seen in FIG. 2, tubular male member 12 has an axis 22 with a thin wall defining inner 24 and outer 26 surfaces. Tubular female member 16 is disposed about the axis 22 and has a thin wall defining inner 28 and outer 30 surfaces.

Figure 3:
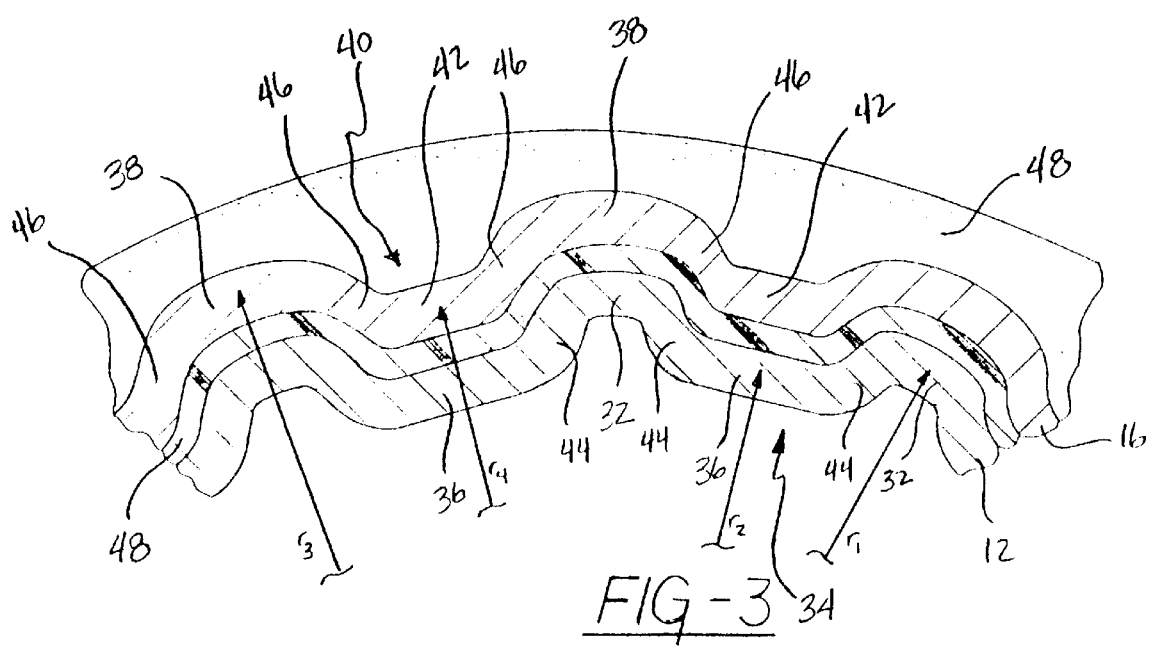
FIG. 3 is an enlarged view of the male and female members as shown in FIG. 2.

Referring to FIG. 3, the thin wall of the male member 12 presents circumferentially extending first generally linear portions 32 disposed at a first radius $r_1$ about the axis 22. For purposes of this application, the radius of a linear portion is measured to a center of the linear portion. The male member 12 has a male tooth portion, generally shown at 34, which separates the next adjacent first generally linear portion 32. Each male tooth 34 has a circumferentially extending second generally linear portion 36 disposed at a second radius $r_2$ about the axis 22. The first radius $r_1$ is larger than the second radius $r_2$. Similarly, the thin wall of the female member 16 presents circumferentially extending third generally linear portions 38 disposed at a third radius $r_3$ about the axis 22. The female member 16 has a female tooth portion, generally shown at 40, which separates the next adjacent third generally linear portion 38. Each female tooth 40 has a circumferentially extending fourth generally linear portion 42 disposed at a fourth radius $r_4$ about the axis 22. The third $r_3$ radius is larger than the fourth $r_4$ radius. In the preferred embodiment, the first 32, second 36, third 38, and fourth 42 generally linear portions are linear.

Each male tooth 34 includes a pair of legs 44 extending radially from the second linear portion 36 to the first linear portion 32 and each female tooth 40 includes a pair of legs 46 extending radially from the fourth linear portion 42 to the third linear portion 38. Specifically, each male 34 and female 40 tooth projects inwardly from the first 32 and third 38 linear portions, respectively, toward the axis 22.

The legs 44, 46 of the male 34 and female 40 teeth overlap in the radial direction for drivingly engaging the male 12 and female 16 members. The teeth 34 of the male member 12 have a close tolerance fit with the teeth 40 of the female member 16 to minimize backlash from any transmission of torque.

In addition to the nonrotatable engagement, the male member 12 slides within the female member 16 to permit relative longitudinal movement between the two members 12, 16. This sliding movement is necessary for assembly and disassembly of the two members 12, 16 and for absorbing exterior forces from a road surface. Specifically, the male member 12 slides approximately five inches within the female member 16 during assembly and disassembly and typically slides about one inch during typical driving operations.

In the preferred embodiment, an elastomeric sleeve 48 is adhered to and conforms with the inner surface 28 of the female member 16 and is complementary in configuration to the outer surface 26 of the male member 12. The sleeve 48 also adheres to a small portion of the outer surface 30 of the female member 16. The sleeve 48 assists in filling any imperfections or gaps between the male 12 and female 16 members. The legs 44, 46 of the male 34 and female 40 teeth actually engage the sleeve 48 for driving the male 12 and female 16 members. In other words, the sleeve 48 serves as a tooth size control and as a wear surface. As the female member 16 begins to rotate, the portion of the sleeve 48 covering the legs 46 of the female member 16 engages the legs 44 of male member 12. As discussed hereinbelow, the female member 16 is typically the drive shaft and the male member 12 is typically the driven shaft.

Figure 4:
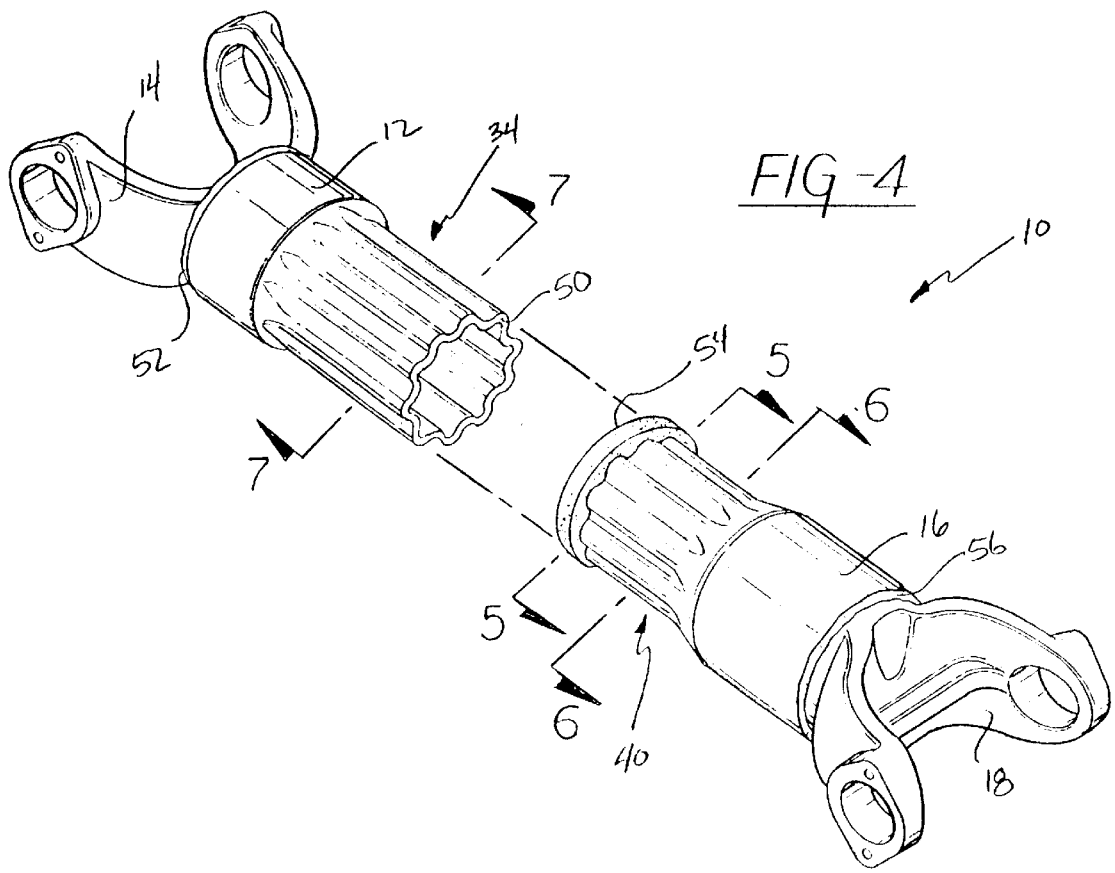
FIG. 4 is a perspective view showing the male member in spaced relationship to the female member.

As can be seen in FIG. 4, male member 12 is an elongated tube having first 50 and second 52 ends with the yoke 14 fixedly secured to second end 52. Similarly the female member 16 is an elongated tube having first 54 and second 56 ends with the yoke 18 fixedly secured to second end 56.

The male 12 and female 16 members may be cut in length to any appropriate size for meeting desired specifications. Once sized, the yokes 14, 18 are welded to the second ends 52, 56 of the members 12, 16. The yokes 14, 18 are in turn connected to an appropriate input drive shaft (not shown) and an appropriate output drive shaft (not shown). These types of yokes are well known by those skilled in the art. In the preferred embodiment, the yoke 18 of the female member 16 is connected to a coupling shaft (not shown) which in turn is connected to a transmission (not shown). The yoke 14 of the male member 12 is in turn connected to a wheel axle (not shown). As discussed above, the male 12 and female 16 members are nonrotatably connected, which transmits rotational movement from the transmission to the wheel axle.

Figure 5:
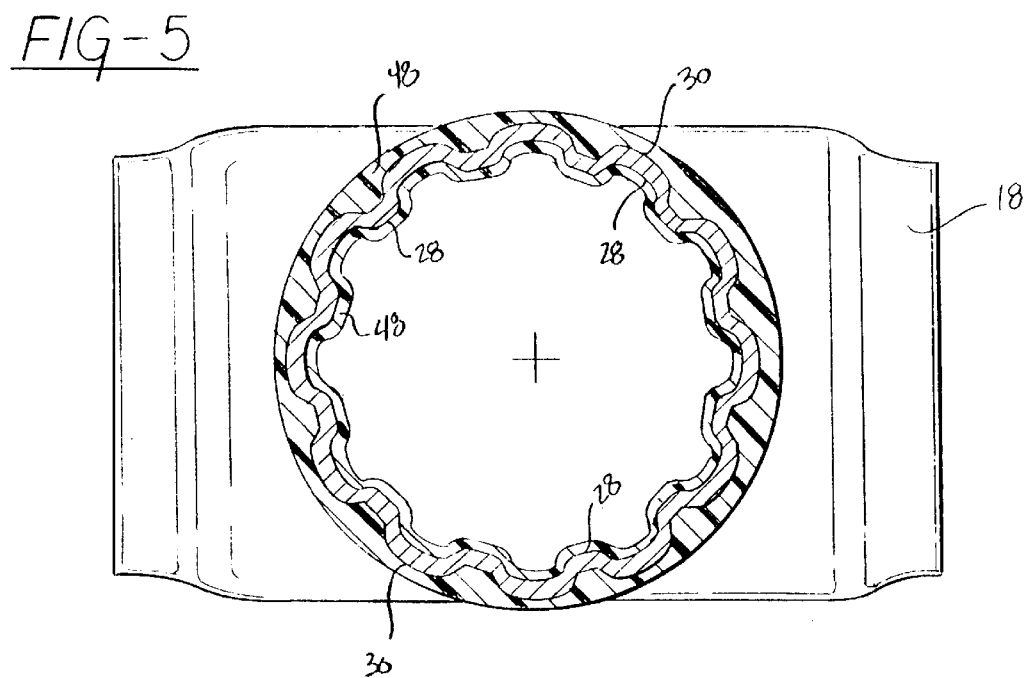
FIG. 5 is a cross-sectional view taken along line 5—5 of FIG. 4.

FIG. 5 discloses a cross-sectional view through the first end 54 of the female member 16 which clearly shows the sleeve 48 adhered to the inner 28 and outer 30 surfaces of the female member 16. As discussed in the background section, there is a degree of shrinkage when the sleeve 48 cools from an injection temperature to an operating or ambient temperature which allows the male member 12 to slide within the female member 16.

Figure 6:
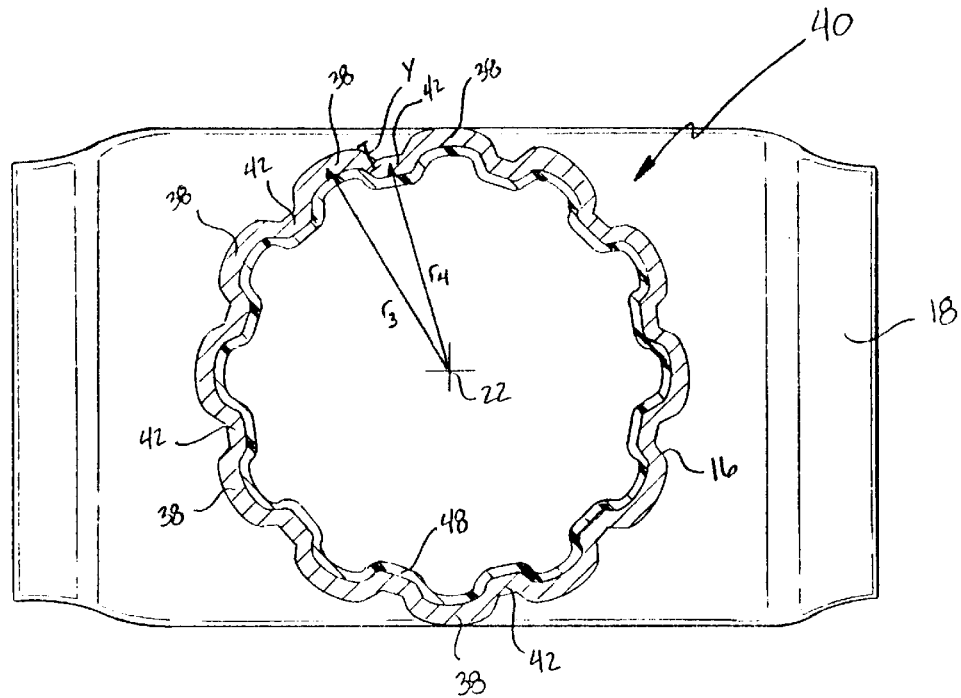
FIG. 6 is a cross-sectional view taken along line 6—6 of FIG. 4.
Figure 7:
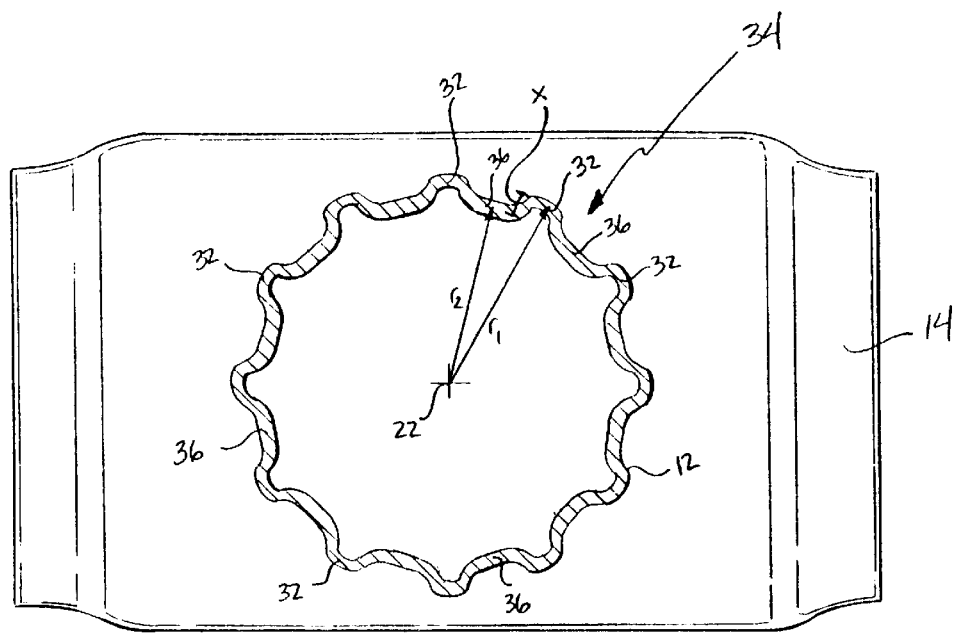
FIG. 7 is a cross-sectional view taken along line 7—7 of FIG. 4.

As best shown in the cross-sectional view of FIG. 7, the first radius $r_1$ differs in length from the second radius $r_2$ a distance X which, in the preferred embodiment, is less than 25% of the first radius $r_1$. Similarly, and as shown in the cross-sectional view of FIG. 6, the third radius $r_3$ differs in length from the fourth radius $r_4$ a distance Y which is less than 25% of the third radius $r_3$. Even more preferably, distance X is less than 20% of the first radius $r_1$ and distance Y is less than 20% of the third radius $r_3$. Accordingly, the teeth 34, 40 of the male 12 and female 16 members are relatively small in comparison to the overall diameters of the male 12 and female 16 members.

In one embodiment, the first radius $r_1$ is 1.9225 inches and the second radius $r_2$ is 1.7295 inches as measured from the center point of the first linear portions 32 and the second linear portions 36, respectively. The distance X is 0.193 inches which equates to approximately 10% of the first radius $r_1$. The third radius $r_3$ is 2.142 inches and the fourth radius $r_4$ is 1.9505 inches as measured from the center point of the third linear portions 38 and the fourth linear portions 42, respectively. The distance Y is 0.1915 inches which equates to approximately 9% of the third radius $r_3$.

As also shown in FIGS. 6 and 7, the second 36 and third 38 linear portions have a circumferential distance at least as long as the first 32 and fourth 42 linear portions. In the preferred embodiment, the second 36 and third 38 linear portions are longer than the first 32 and fourth 42 linear portions. In other words, the linear portions or spaces between the teeth are longer than the teeth themselves. In fact, the second 36 and third 38 linear portions form more than ½ of the entire circumference of each of the male 12 and female 16 members. Also, each male 34 and female 40 tooth forms less than 1/20 of the entire circumference the male 12 and female 16 members. Specifically, each male 34 and female 40 tooth is located thirty degrees apart as referenced from the axis 22 of the male 12 and female 16 members. This configuration of teeth and linear portions or spaces is very effective in transmitting high torque rotational forces from one member to another.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A driveline assembly comprising;
   a tubular male member having an axis with a thin wall defining inner and outer surfaces disposed about said axis of said male member;
   a tubular female member disposed about said axis and having a thin wall defining inner and outer surfaces of said female member;
   a sleeve adhered to one of said tubular male member and said tubular female member, and conforming with said inner surface of said female member and said outer surface of said male member to substantially fill any spaces between said tubular male member and said tubular female member;
   said male member having first and second ends with a yoke fixedly secured to said second end of said male member;
   said female member having first and second ends with a yoke fixedly secured to said second end of said female member;
   said thin wall of said male member presenting circumferentially extending male teeth;
   said thin wall of said male member also presenting circumferentially extending first generally linear portions centered on a first radius about said axis and said male tooth separating next adjacent first generally linear portions, each male tooth having a circumferentially extending second generally linear portion centered on a second radius about said axis;
   said thin wall of said female member presenting circumferentially extending female teeth; and
   said thin wall of said female member also presenting circumferentially extending third generally linear portions centered on a third radius about said axis and said female tooth separating next adjacent third generally linear portions, each female tooth having a circumferentially extending fourth generally linear portion centered on a fourth radius about said axis.

2. An assembly as set forth in claim 1 wherein said first radius is larger than said second radius and said third radius is larger than said fourth radius.

3. An assembly as set forth in claim 2 wherein said first, second, third, and fourth generally linear portions are linear.

4. An assembly as set forth in claim 3 wherein each male tooth includes a pair of legs extending radially from said second linear portion to said first linear portion and each female tooth includes a pair of legs extending radially from said fourth linear portion to said third linear portion.

5. An assembly as set forth in claim 4 wherein each male and female tooth projects inwardly from said first and third linear portions, respectively, toward said axis.

6. An assembly as set forth in claim 5 wherein said legs of said male and female teeth overlap in the radial direction for drivingly engaging said male and female members.

7. An assembly as set forth in claim 1, wherein said sleeve is adhered to said female tubular member.

8. An assembly as set forth in claim 7 wherein said sleeve is adhered to said inner surface of said female member and is complementary in configuration to said outer surface of said male member and said sleeve also adheres to a portion of said outer surface of said female member.

* * * * *